(12) United States Patent
Bongers et al.

(10) Patent No.: US 9,301,437 B1
(45) Date of Patent: Apr. 5, 2016

(54) HEDGE SEPARATOR AND METHOD FOR USING THE SAME

(71) Applicant: MS TREES, LLC., Silverton, OR (US)

(72) Inventors: Peter Bongers, Boekel (NL); Gerrit Massink, Opheusden (NL)

( * ) Notice: Subject to any disclaimer, the term of this patent is extended or adjusted under 35 U.S.C. 154(b) by 0 days.

(21) Appl. No.: 14/536,925

(22) Filed: Nov. 10, 2014

(51) Int. Cl.
| | |
|---|---|
| *A01B 49/04* | (2006.01) |
| *A01G 3/04* | (2006.01) |
| *A01G 3/053* | (2006.01) |
| *A01D 34/835* | (2006.01) |
| *A01D 43/12* | (2006.01) |

(52) U.S. Cl.
CPC .............. *A01B 49/04* (2013.01); *A01D 34/835* (2013.01); *A01D 43/12* (2013.01); *A01G 3/04* (2013.01); *A01G 3/053* (2013.01)

(58) Field of Classification Search
CPC ..... A01D 34/07; A01D 34/63; A01D 34/835; A01D 43/12; A01D 91/02; A01G 3/04; A01G 3/0417; A01G 3/0435; A01G 2003/0461; A01B 49/00; A01B 49/04
USPC ................... 56/233–237, 247; 111/101, 103; 37/302; 172/380, 24, 900; 171/45, 46, 171/62
See application file for complete search history.

(56) References Cited

U.S. PATENT DOCUMENTS

| | | | | |
|---|---|---|---|---|
| 2,564,032 | A | | 7/1948 | Robertson |
| 2,483,772 | A | * | 10/1949 | Holmes ................ A01D 34/866 56/11.2 |
| 2,669,065 | A | | 2/1950 | Clegg |
| 2,762,186 | A | | 9/1956 | Janata |
| 3,738,431 | A | | 6/1973 | Gennow |
| 3,977,099 | A | * | 8/1976 | Stewart ................ A01G 23/046 111/101 |
| 4,271,611 | A | | 6/1981 | Paul |
| 4,305,213 | A | * | 12/1981 | Pelham ................ A01G 23/043 111/101 |
| 4,332,093 | A | * | 6/1982 | Berthollet ............ A01G 23/043 111/101 |
| 4,355,497 | A | * | 10/1982 | Murphy ............... A01G 3/0435 56/10.2 R |
| 4,455,815 | A | * | 6/1984 | Grant ................... A01G 3/0435 56/235 |
| 4,494,325 | A | * | 1/1985 | Berthollet ............ A01G 23/043 111/101 |
| 5,842,427 | A | * | 12/1998 | Hunter ................. A01G 23/046 111/101 |
| 5,921,020 | A | | 7/1999 | Avidan |
| 5,991,694 | A | * | 11/1999 | Gudat .................. A01B 79/005 56/10.2 A |
| 6,382,113 | B2 | * | 5/2002 | Opitz ................... A01G 23/046 111/101 |
| 7,770,325 | B2 | | 8/2010 | Kadosh |

* cited by examiner

*Primary Examiner* — John G Weiss
(74) *Attorney, Agent, or Firm* — Frank J. Dykas; Dykas Law Offices, PLLC

(57) ABSTRACT

A hedgerow cutter for cutting a hedgerow having a root mass, stalks, branches and foliage, into smaller hedgerow segments is formed of a frame, having a vertically oriented centerline, adapted for attachment to a powered vehicle sized and configured to travel alongside, and parallel to a hedgerow, a root cutting spade assembly sized to be driven down and through the root mass of the hedgerow to cut and thereby separate a segment of the hedgerow root mass from the hedgerow and an elongated hedge cutter assembly, for cutting through the hedgerow stalks, branches and foliage, said hedge cutter assembly attached to the upper portion of the spade assembly and oriented to extend generally upwardly and means for extending the root cutting spade assembly outwardly and downwardly away from the centerline and into the hedgerow root mass to separate the root mass of the hedgerow segment from the hedgerow and extending the hedge cutter assembly into the stalks, branches and foliage of the hedgerow to separate the hedgerow segment from the hedgerow.

11 Claims, 8 Drawing Sheets

US 9,301,437 B1

HEDGE SEPARATOR AND METHOD FOR USING THE SAME

TECHNICAL FIELD

This invention generally relates to the separation of pre-grown hedges into transportable units and more particularly to a hydraulic hedge separator which can be used to simultaneously separate the foliage and the root ball of a preselected length of hedge from a larger row of hedge.

BACKGROUND

There is ongoing growth in the landscaping industry at large. The use of pre-grown sod as a substitute of seed planting for lawn grasses has become far more common and widely accepted. The same can be said for nursery grown trees, bushes, flowering shrubs and the like. It is not uncommon for a newly constructed home or other building to then be landscaped to the extent that it appears as if the landscaping is matured at the time it is planted.

The same can be done for hedgerows. In a commercial nursery environment the process begins with rooted cuttings, or seed germination with the seeds planted in individual seed cups or trays and kept in a warm environment, with access to direct sunlight, suitable for seed germination, often in a green house. The seedlings, or rooted cuttings, as they grow, are then repotted into larger pots and allowed to grow to suitable size. When the still immature plants are of suitable size and hardiness, they are then planted in rows in the ground where they can be adequately cultivated and watered so that they can grow into a hedgerow suitable for transplantation to a final landscaping site.

However, the prior art for replanting a hedgerow has traditionally been accomplished by hand. A small portion of a hedgerow, pre-grown at a nursery, will be cut using a hand shovel into smaller portions of one or two plants and the root balls for the small sections are dug up using a shovel and individually wrapped in a ball using a loosely weaved cloth to hold the soil to the roots to prevent the roots from drying out. These numerous balls can then be transported to landscaping sites where they are replanted one at a time back in a row to form the hedge. It is difficult to handle by hand larger portions of the hedge and their attendant root balls and up until now, nothing has been done to automate this process. Furthermore, if the hedges were planted next to each other in the nursery, when replanting at the final landscaping site, it is difficult to position them together again. When individually harvested and replanted, the portions which grew together are difficult, if not impossible to mate up in the same way they were situated in the nursery setting.

This, of course, is time consuming and expensive way to transplant hedges. When the property owner desires to incorporate a hedge as a landscaping feature, it is typically planted by hand with relatively small plants which are spaced apart and with the hopes that they will eventually grow together to form a fully formed hedgerow. Hedgerows can be made of a variety of different plants including trees, shrubs, and perennial bunch grasses which have erect stems attaining average heights of at least a couple of feet and persist well over the winter. Some of the trees include Maple, Arborvitae, Yew, White Spruce, Hawthorne, Hemlock; the shrubs include Buckwheat, Coffeeberry, Coyote Bush and Quail Bush.

It is the object of the present invention to automate transplantation, foliage separation, and root-pruning of a nursery grown hedgerow using equipment capable of cutting and separating preselected lengths of a preexisting hedgerow, grown in a nursery, and depositing them into tray like containers, which preferably should be biodegradable, which can then be loaded onto a truck or trailer and transported to the landscaping job site where they are off-loaded and planted.

SUMMARY OF THE DISCLOSURE

A double spade hedge separator is provided which is formed of left and right blades which are intended to function as spades for insertion into the earth to separate sections of root balls from adjacent and parallel hedgerows, such as those grown in a nursery. A pair of vertically oriented vegetation cutter assemblies are also provided to cut through the vegetation as the blades are driven into the ground to separate the root system. The double spade hedge separator is adapted for attachment to a conventional hitch of a standard, hydraulically equipped agricultural tractor of the type commonly used in commercial plant nurseries. It should be pointed out that the double spade hedge separator is the preferred embodiment, however a single spade hedge row separator will work equally well. The reason the double spade embodiment is preferred is that the lateral forces imparted to the blades as they are driven into the root balls of parallel hedgerows generally offset each other thus minimizing the deflection to the three point hitch of the tractor to which the double spade hedge separator is attached.

The hedgerow separator is adapted for attachment to a three point tractor hitch.

The left and right blades and vegetation cutting bar assemblies are constructed in exactly the same manner, using the same component parts, and each assembly is simply flipped around to become a mirror image of each the other except instead of extending out in opposite directions. The left blade is attached to the left blade shaft sleeve, and right blade is attached to the right blade shaft sleeve. Each blade shaft sleeve is enclosed within a protective cylinder sleeve. Each blade is attached to a hydraulic ram shaft by means of attachment pins, and is encased within a cylinder sleeve so as to protect it from contaminants such as dirt and other abrasive materials found at the nursery where the hedgerow is initially grown. There are a pair of connecting braces which form a support for left upper guides which are attached in parallel spaced relationship to the cylinder sleeves.

A stationary vegetation cutter assembly frame is mounted and connected to each vegetation cutter frame member by means of upper and center braces. The stationary cutter blade frame members are themselves attached at their lower ends to a spade and blade shaft sleeve by means of a bracket. In this manner the stationary cutter blade frame members are held interconnected and held in parallel spaced relationship with the vertical cutter frames.

A pair of traveler cars are slideably attached to the upper guides, and attached to vegetation cutter frames by means of brackets which are sized to maintain and the upper guides in a vertical orientation, and to maintain that vertical orientation when the blades are extended. It is intended as the blades and blade shaft sleeves are driven by means of the hydraulic ram shafts into the ground that the traveler cars will travel along the upper guides maintaining a vertical orientation for the cutter frame members. The vertical cutter assemblies are comprised of a well known design having a stationary cutter assembly frame members to which are attached a plurality of stationary teeth. In a like manner, there are, slidably attached to the stationary cutter assembly frames, slidable sets of cutting teeth which in turn are then reciprocally oscillated up and down along vertical cutter assembly frames by means of pitman arm drives which drive pitman drive shafts which are powered by hydraulic motors. Hydraulic motors are the preferred embodiment, but it should be understood electric motors or powers source could also be used in this application.

The cylinder sleeves are provided with bracket slots which are adapted in size and length to receive the lower portion of the blade brackets and thus enable the blade shafts to fully retract into the cylinder sleeves. Reinforcing ribs are also provided to ensure that the lower portion of the cylinder sleeves do not bend, deflect or deform as a result of lateral forces that may be imparted to the blade shaft sleeves as the result of the driving the blade blades into the root ball of the hedgerows and the ground.

Both hedgerow cutter assemblies are securely attached to an attachment frame formed of a pair of attachment frame members which are securely interconnected by a lower cross member and upper cross members, which together form a solid frame to which clevis brackets are welded. The attachment frame assembly is sized to receive the standard prior art attachment arms of a three point hitch, and to secure attachment points for both the left and right hedge separator assemblies.

The source of high power hydraulic fluid is the on-board hydraulic system of the tractor to which hedgerow separator is attached. Hydraulic controls, also of conventional design can be as simple as hydraulic valves placed in any convenient location on the tractor within reach of the operator who is driving the tractor, or on a valve manifold attached to the rear of hedgerow separator assembly. Hydraulic control is provided by a single, remotely operated valve with an on-off switch conveniently placed within reach of the tractor operator, and interconnected to both the left and right hydraulic ram assemblies and the left and right hydraulic motors driving the left and right vegetation cutting assemblies, such that when the operator turns the switch on, both left and right hydraulic rams start to extend to begin driving the left and right blades into the root balls, and simultaneously turning on both the left and right hydraulic motors to begin scything operation of the vegetation cutters assemblies. Once the rams reach full extension, a limit switch is tripped thus causing the hydraulics to reverse, retracting the blades and turning off the vegetation cutters. Also provided is an operator controlled selector switch which enables the operator to select operation of either the left or right cutting assemblies individually, or both simultaneously. Alternatively the hydraulic controls can be managed and controlled by a precision GPS unit such as is manufactured by the Trimble Company as Model No. FM-1000, with Autopilot and RTK accuracy unlock which autopilot the tractor to position and stop it at fixed intervals along the nursery hedgerow and activate the hydraulic systems of the hedgerow cutter to separate hedgerow segments from the row. The hedgerow separator is used in an automated system for moving and transplanting hedgerows. This method begins with the hedgerow plants germinated from seed, or as rooted cuttings, and as the plants grow to a designated size they are repotted and continue to grow to a size appropriate for transplanting to an outdoor hedgerow bed in the nursery. They are then transplanted into a row in the nursery where they will continue to grow until they fully form a hedgerow of acceptable size and density is formed. Next the root balls are cut using a standard U shaped root cutter which is driven into the ground, underneath the root ball along the hedgerow in a plow like fashion to separate the bottom and the sides of the root ball from the surrounding earth. The hedgerow separator is then driven between the rows of the now fully formed hedges where hedgerow segments of preselected lengths of each row can then be separated from the elongated hedgerow into a length that is suitable for handling, transport and transplanting. A claw shaped lifting device of some sort is then used to pick up each uniform section of hedgerow and deposit it into a waiting, tray which can then be picked up and transported to the landscaping job site.

At the job site, the process is then reversed as the preformed hedgerow sections are offloaded at the job site and again, picked up and placed in alignment, end to end in a trench along the length of the intended hedgerow. Once the hedgerow sections have been aligned in position in the trench, the trench is then back filled and suitable mulching materials can be deposited around the base of the hedgerow, near the location of the root flair. The hedge is then fully formed and constitutes an attractive and mature looking hedgerow without having to attend to individual plants and plant each one by hand as has been done in the past. Rather then having to wait for 3-10 years and train individual plants into a uniform hedgerow, you can plant a fully formed hedge immediately.

DETAILED DESCRIPTION OF THE PREFERRED EMBODIMENT

Figure 1:
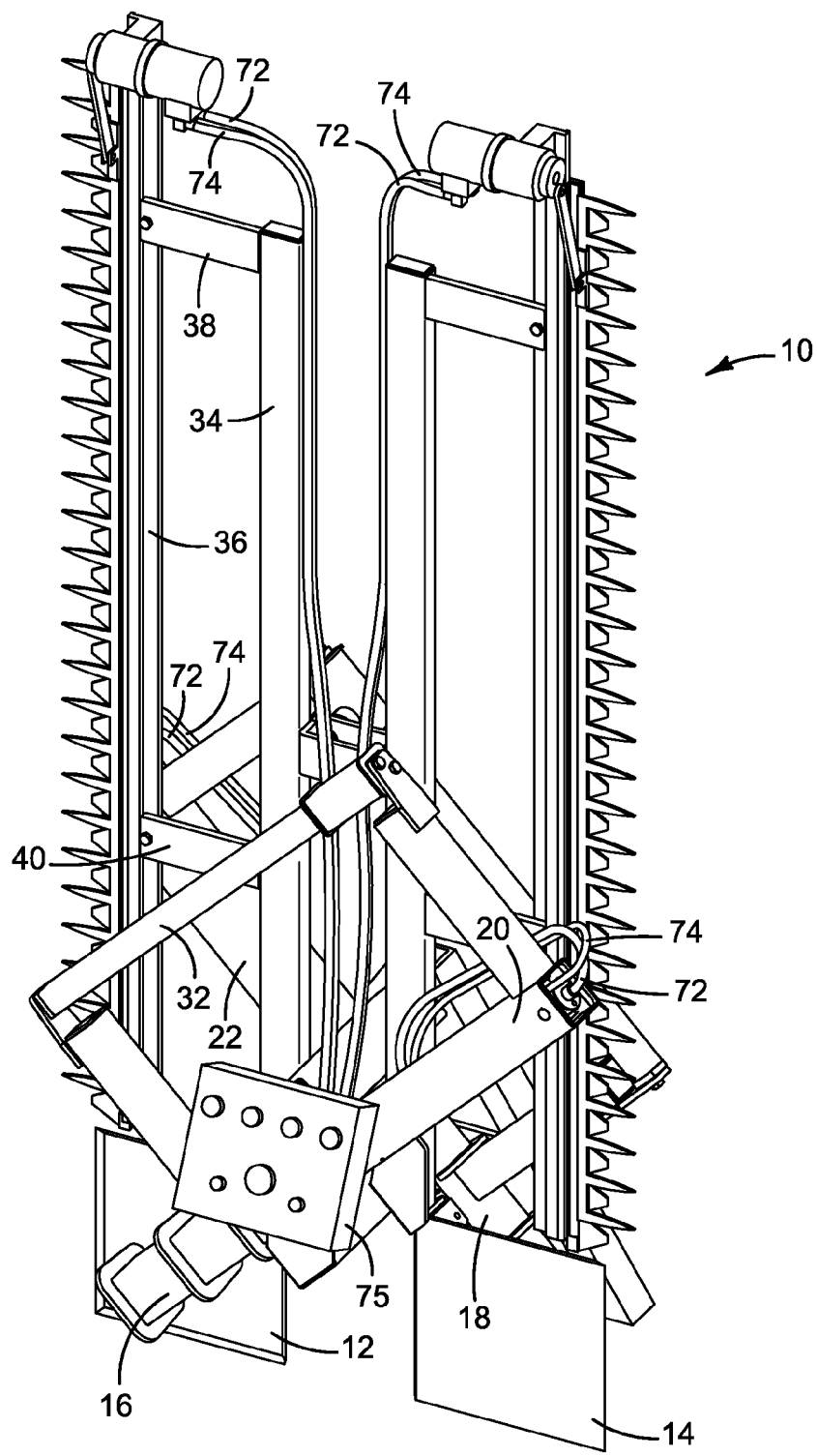
FIG. 1 is a perspective representation back view of a double spade hedge separator in a retracted position.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 4:
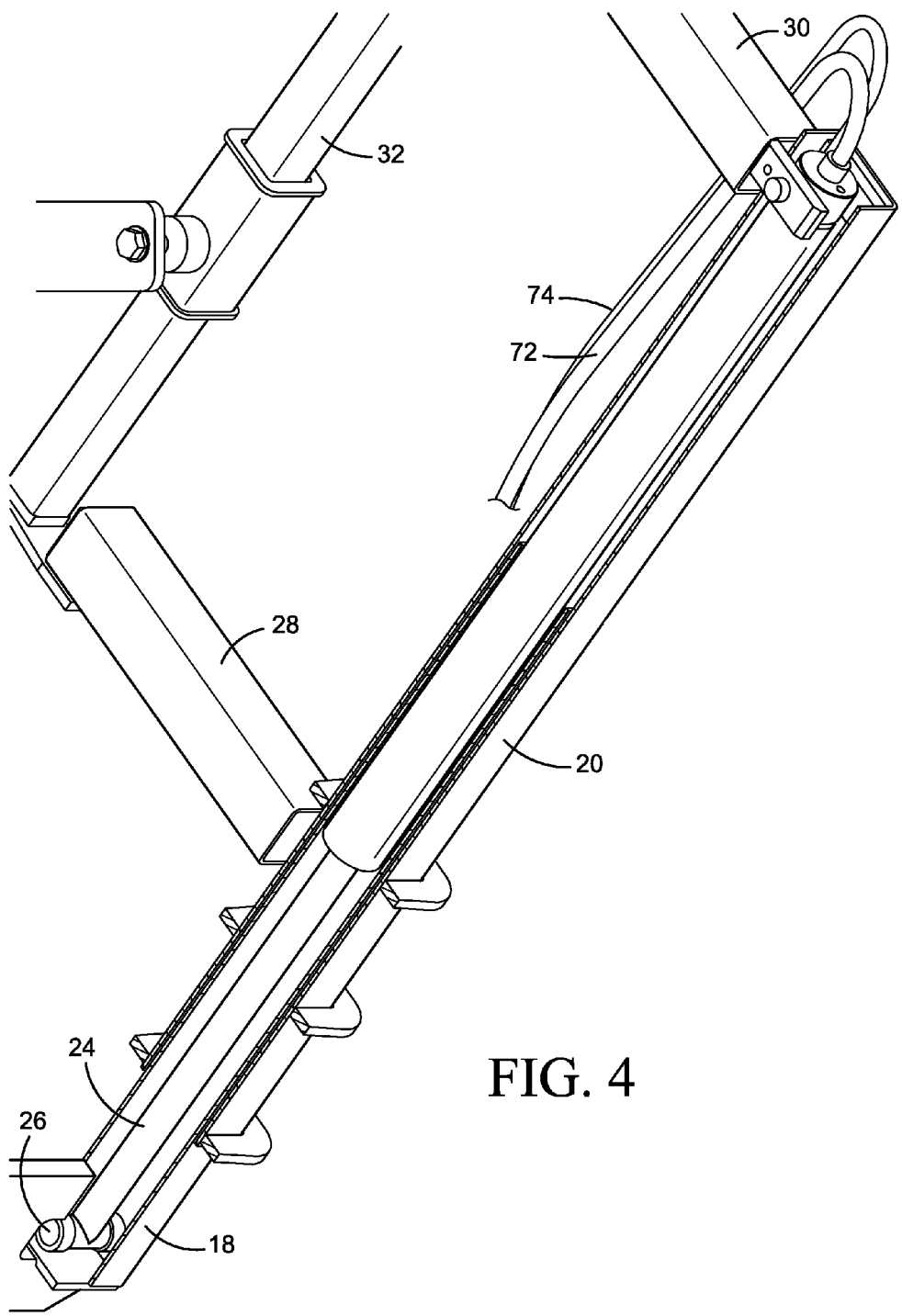
FIG. 4 is a cutaway side view of a hydraulic ram assembly.
Figure 5:
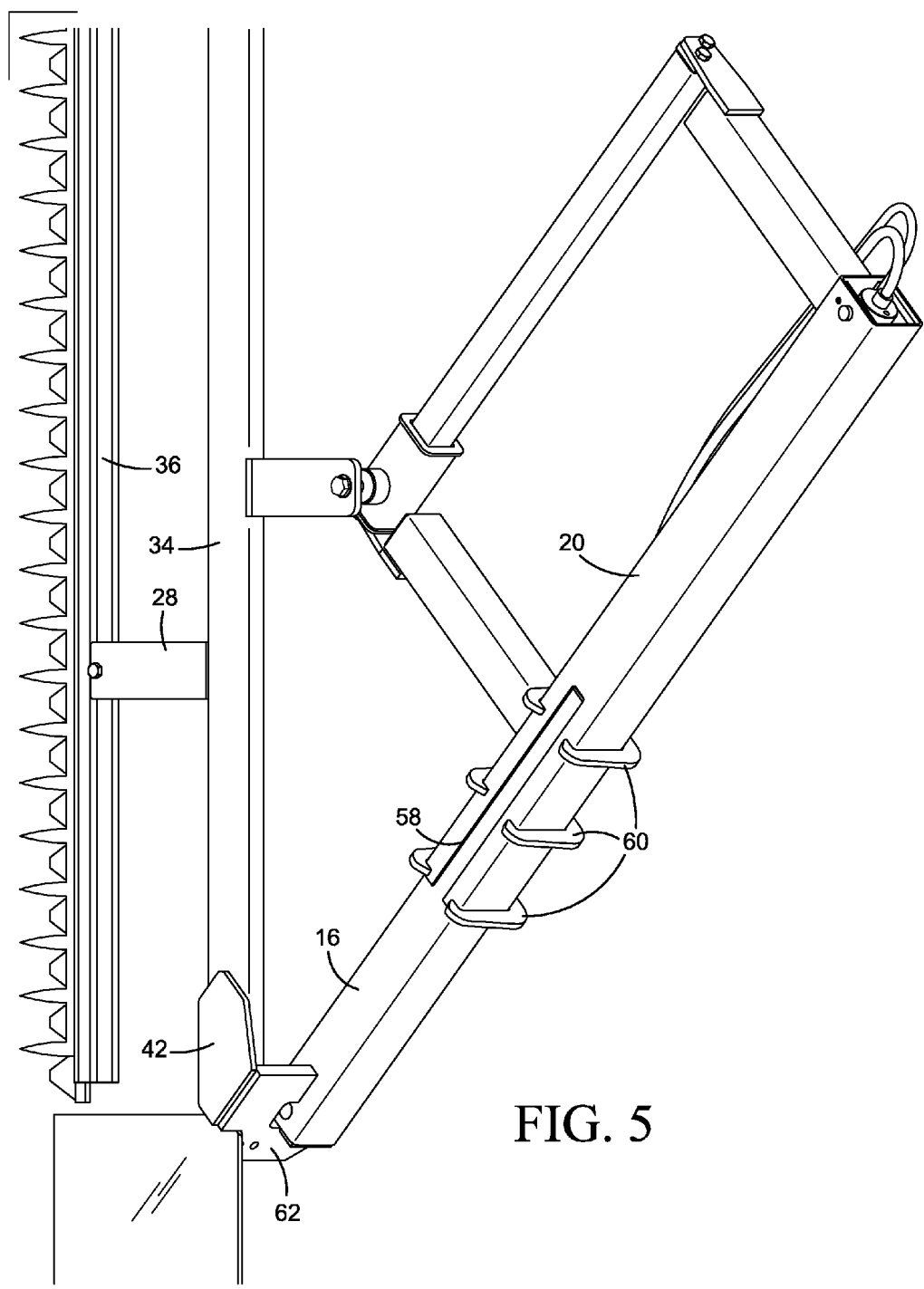
FIG. 5 is a perspective representational view of the hydraulic and frame ram assembly showing a preferred embodiment of the ram sleeve assembly.
Figure 6:
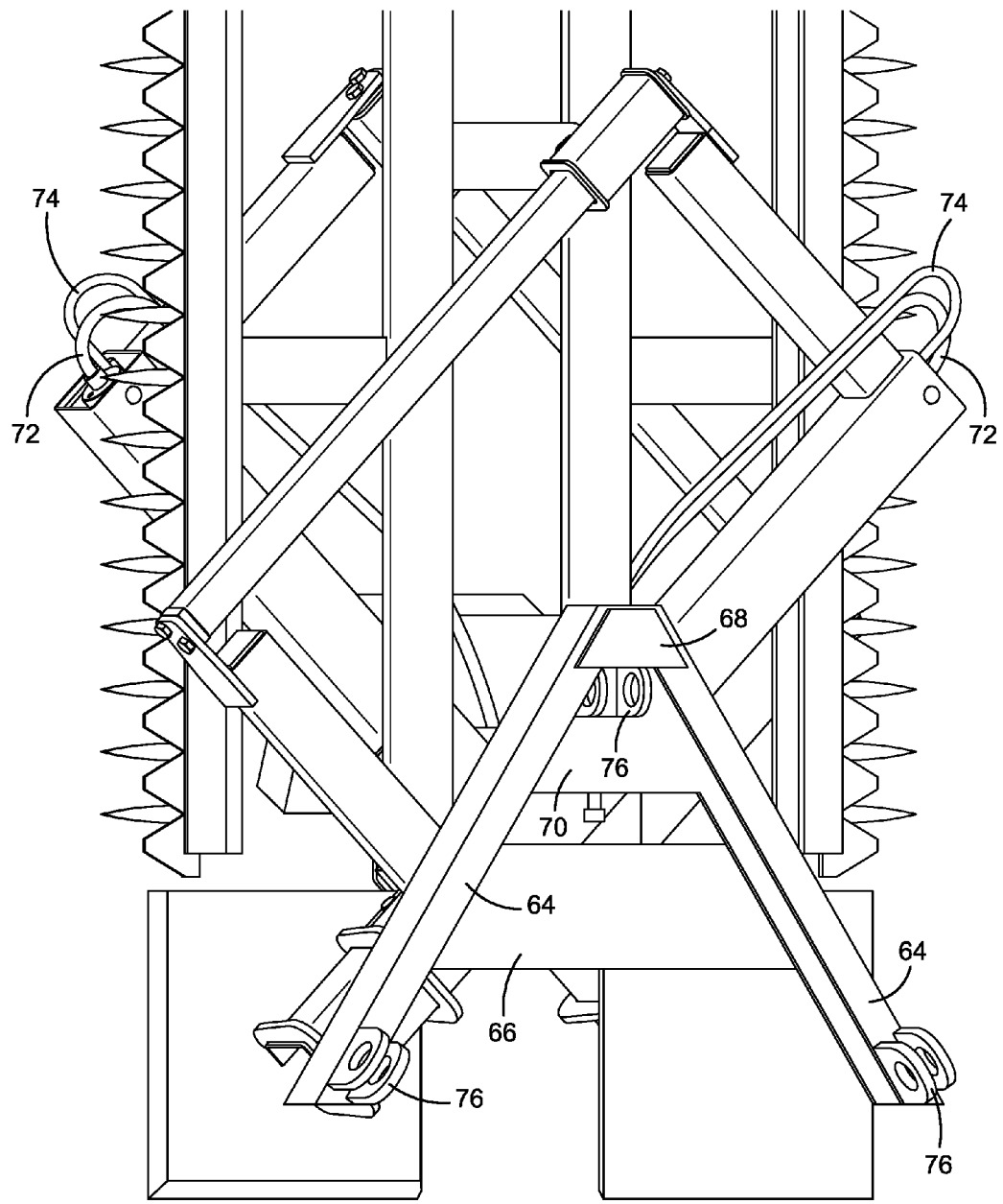
FIG. 6 is a partial perspective representation front view of a double spade hedge separator in a retracted position and showing the three point hitch connection subassembly for attachment to the three point hitch of a tractor.

Referring to FIGS. 1 through 5, there is shown a back view of a double spade hedge separator 10 which is formed of left and right blades 12 and 14 which are intended to function as spades for insertion into the earth to separate sections of root balls from adjacent and parallel hedgerows, such as those grown in a nursery. A pair of vertically oriented vegetation cutter assemblies are provided to cut through the vegetation as the blades are driven into the ground to separate the root system. The double spade hedge separator 10 is, in the preferred embodiment, adapted for attachment to a conventional hitch of a standard, hydraulically equipped agricultural tractor of the type commonly used in commercial plant nurseries. For purposes of orientation, FIG. 1 is designated a back view of a double spade hedge separator since it is the view of the hedge row separator when viewed from behind the tractor. The front view is shown in FIG. 6.

Additionally it should be pointed out that the double spade hedge separator is the preferred embodiment, however a single spade hedge row separator will work equally well. The reason the double spade embodiment is preferred is that, as will be explained, the lateral forces imparted to the blades as they are driven into the root balls of parallel hedgerows generally offset each other thus minimizing the deflection to the three point hitch of the tractor to which the double spade hedge separator is attached.

It should also be pointed out that the fact that the preferred embodiment is adapted for attachment to a three point hitch that is not the only means of mounting; it can just as easily be incorporated into a dedicated means of transport, such as a dedicated vehicle, handcart or even a towable trailer.

Figure 2:
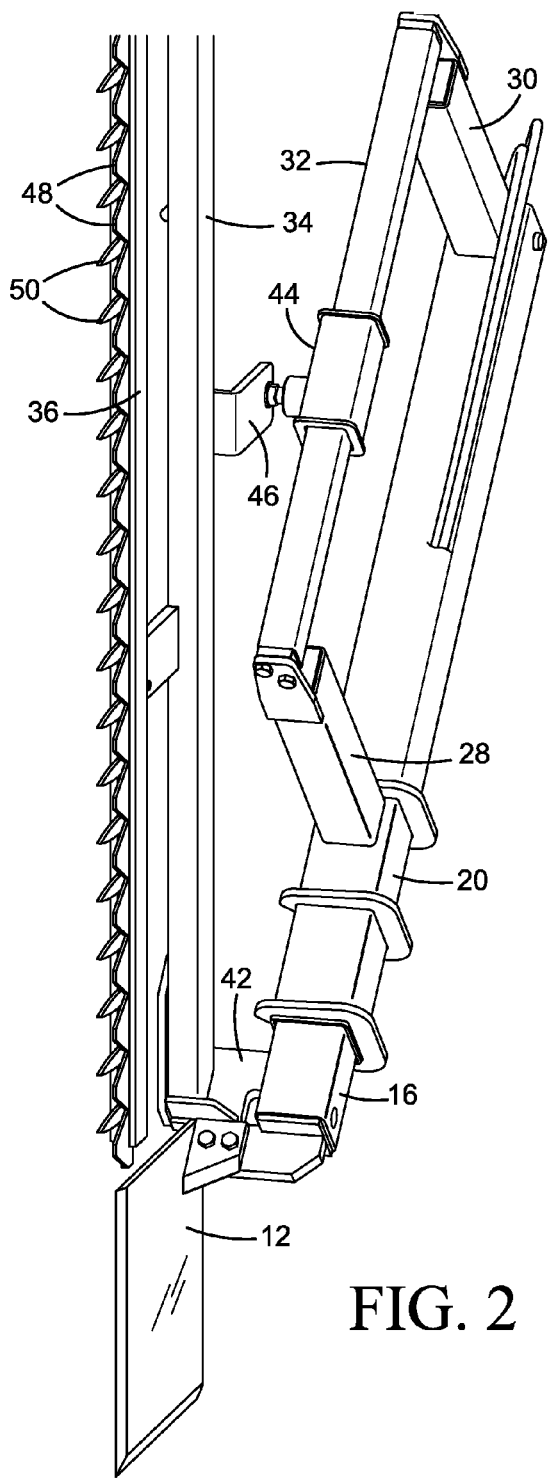
FIG. 2 is a partial perspective representational back view of a single spade hedge separator showing its attachment configuration to the hydraulic ram and frame assembly.
Figure 3:
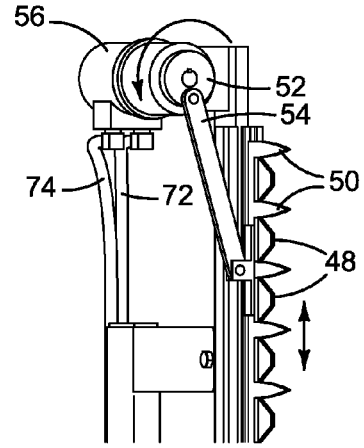
FIG. 3 is a perspective representational view of vegetation cutter bar drive assembly.

What follows is a description of the left blade and vegetation cutting bar assembly. The right blade and vegetation cutting bar assembly is not described in this level of detail, however it should be pointed out that it is constructed in exactly the same manner, using the same component parts, and simply flipped around to become a mirror image of the left assembly, except instead of extending to the left, it extends to the right. Left blade 12 is attached is to left blade shaft sleeve 16, and right blade 14 is attached to right blade shaft sleeve 18, as shown in FIG. 1. Each blade shaft sleeve is enclosed within a protective cylinder sleeve 20 or 22. As shown in FIGS. 2 and 4, left blade 12 is attached at one end of hydraulic ram shaft 24 by means of attachment pin 26, and is encased within the left cylinder sleeve 20 so as to protect it from contaminants such as dirt and other abrasive materials found at the nursery where the hedgerow was initially grown. There are a pair of connecting braces 28 and 30 which form a support for left upper guide 32 which is attached in parallel spaced relationship to cylinder sleeve 20.

Left stationary vegetation cutter assembly frame 36 is mounted and connected to left vegetation cutter frame member 34 by means of upper and center braces 38 and 40. Stationary cutter blade frame member 34 is itself attached at its lower end to left spade 12 and left blade shaft sleeve 18 by means of bracket 42 In this manner stationary cutter blade frame member 34 is held interconnected and held in parallel spaced relationship with left vertical cutter frame 34

Left traveler car 44 is attached slideably attached to left upper guide 32, and attached to left vegetation cutter frame by means of bracket 46 which is sized to maintain and left upper guide 32 in a vertical orientation, and to maintain that vertical orientation when left blade 12 is extended. It is intended as blade 12 and blade shaft sleeve are driven by means of left hydraulic ram shaft 24 into the ground that the left traveler car 44, will travel along upper guide 32 maintaining a vertical orientation for left cutter frame member 34. The vertical cutter assembly is comprised of a well known design of a stationary cutter assembly frame member 36 to which are attached a plurality of stationary teeth 48. In a like manner, there is slidably attached to stationary cutter assembly frame 36 is a slidable set of cutting teeth 50 which is then reciprocally oscillated up and down along vertical cutter assembly frame by means of a pitman arm drive 52 which drives pitman drive shaft 54 which is powered by a hydraulic motor 56. Hydraulic motor 56 is the preferred embodiment, but it should be understood an electric motor or power source could also be used in this application FIG. 5 shows the hydraulic ram assembly as viewed from the rear. It shows to advantage left blade shaft sleeve 16 and its interface with left cylinder sleeve 20, Left cylinder sleeve 20 is provided with bracket slot 58 which is adapted in size and length to receive the lower portion of blade bracket 42 and thus to enable left blade shaft 16 to fully retract into left cylinder sleeve 20. Reinforcing ribs 60 are also provided to ensure that the lower portion of left cylinder sleeve 20 does not bend, deflect or deform as a result of lateral forces that may be imparted to left blade shaft sleeve as the result of the driving of left blade 12 into the root flared portion and the root ball of the hedge and the ground.

The right blade 14 hedge cutter assembly is, in the preferred embodiment, as previously stated, is exactly the same, and constructed of the identical parts as the left blade 12 hedge cutter assembly. It simply flipped over to present a mirror image of the left hedge cutter assembly with right blade 14 extending in the opposite direction. Both are securely attached, in the preferred embodiment they are welded to attachment frame formed of a pair of attachment frame members 64 which are securely interconnected by lower cross member 66, and upper cross members 68 and 70, which together form a solid frame to which clevis brackets 76 are welded. The attachment frame assembly is sized to receive the standard prior art attachment arms of a three point hitch, and to secure attachment points for both the left and right hedge separator assemblies.

What is not shown in the drawings is the hydraulic power supply, as this plays no part in this invention. In the preferred embodiment the hydraulic lines, which are shown partially as hydraulic supply and return lines 72 and 74 in FIGS. 1, 3, 4, 5 and 6. In the preferred embodiment the source of high power hydraulic fluid is the on-board hydraulic system of the tractor to which hedgerow separator 10 is attached. Hydraulic controls, also of conventional design can be as simple as hydraulic valves placed in any convenient location on the tractor within reach of the operator who is driving the tractor, or on a valve manifold, as shown in FIG. 1 attached to the rear of hedgerow separator assembly 10. In the preferred embodiment, hydraulic control is provided is provided by a GPS unit capable of both autopiloting the tractor along fixed intervals alongside the hedgerow and also activating the selected sequence of hedgerow separator operation. In the preferred embodiment the preferred GPS unit is a Trimble Model FM-1000 with autopilot and RTK accuracy unlock. It can also be controlled manually by a single, remotely operated valve with an on-off switch conveniently placed within reach of the tractor operator, and interconnected to both the left and right hydraulic ram assemblies and the left and right hydraulic motors driving the left and right vegetation cutting assemblies, such that when the operator turns the switch on, both left and right hydraulic rams start to extend to begin driving left and right blades 12 and 14 into the root balls, and simultaneously turning on both left and right hydraulic motors to begin scything operation of the vegetation cutters assemblies. Once the rams reach full extension, a limit switch is tripped, not shown, thus causing the hydraulics to reverse, retracting the blades and turning off the vegetation cutters. Also provided is an operator controlled selector switch which enables the operator to select operation of either the left or right cutting assemblies individually, or both simultaneously.

Figure 7:
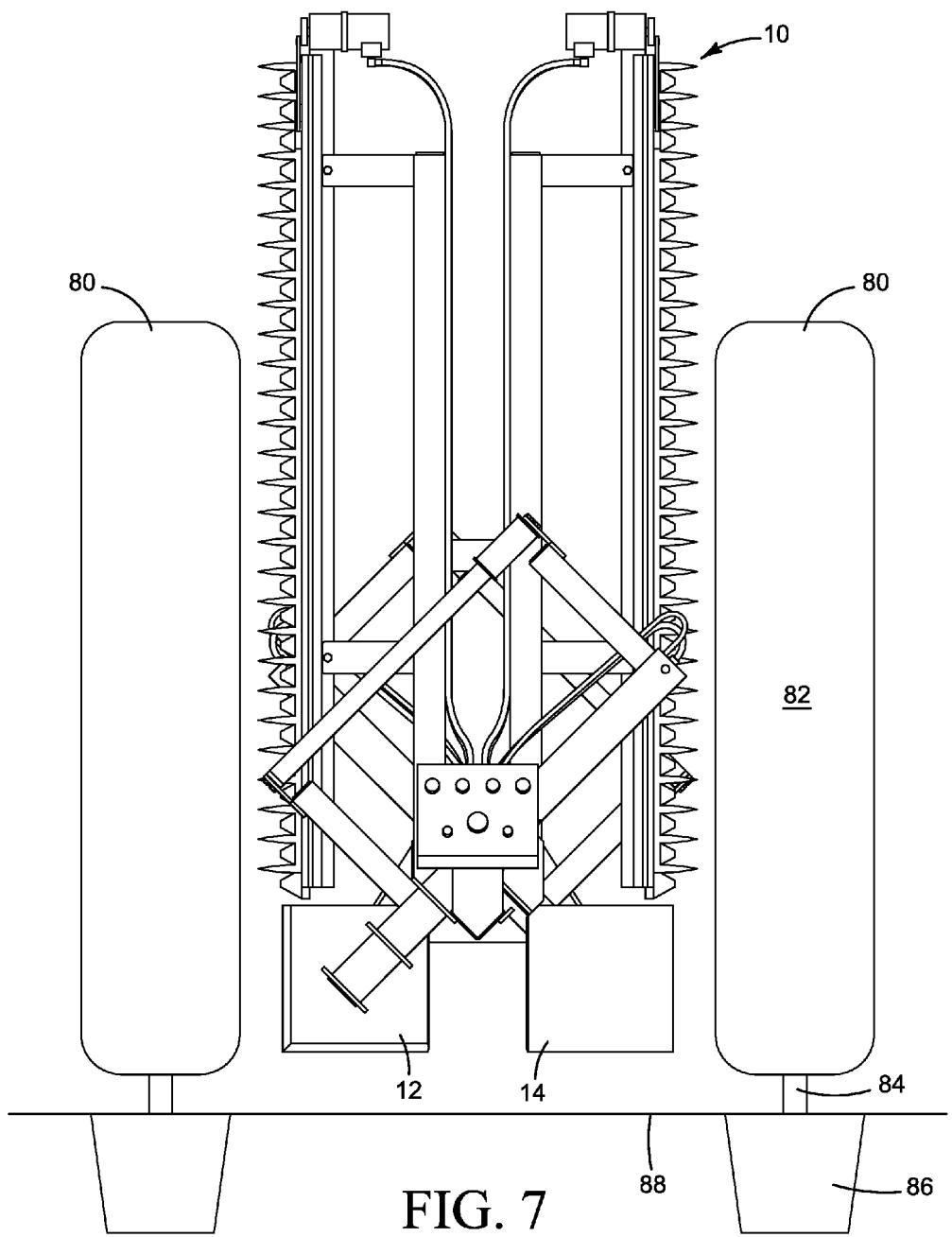
FIG. 7 is back view of a double spade hedge separator in a retracted position positioned between two hedgerows.
Figure 8:
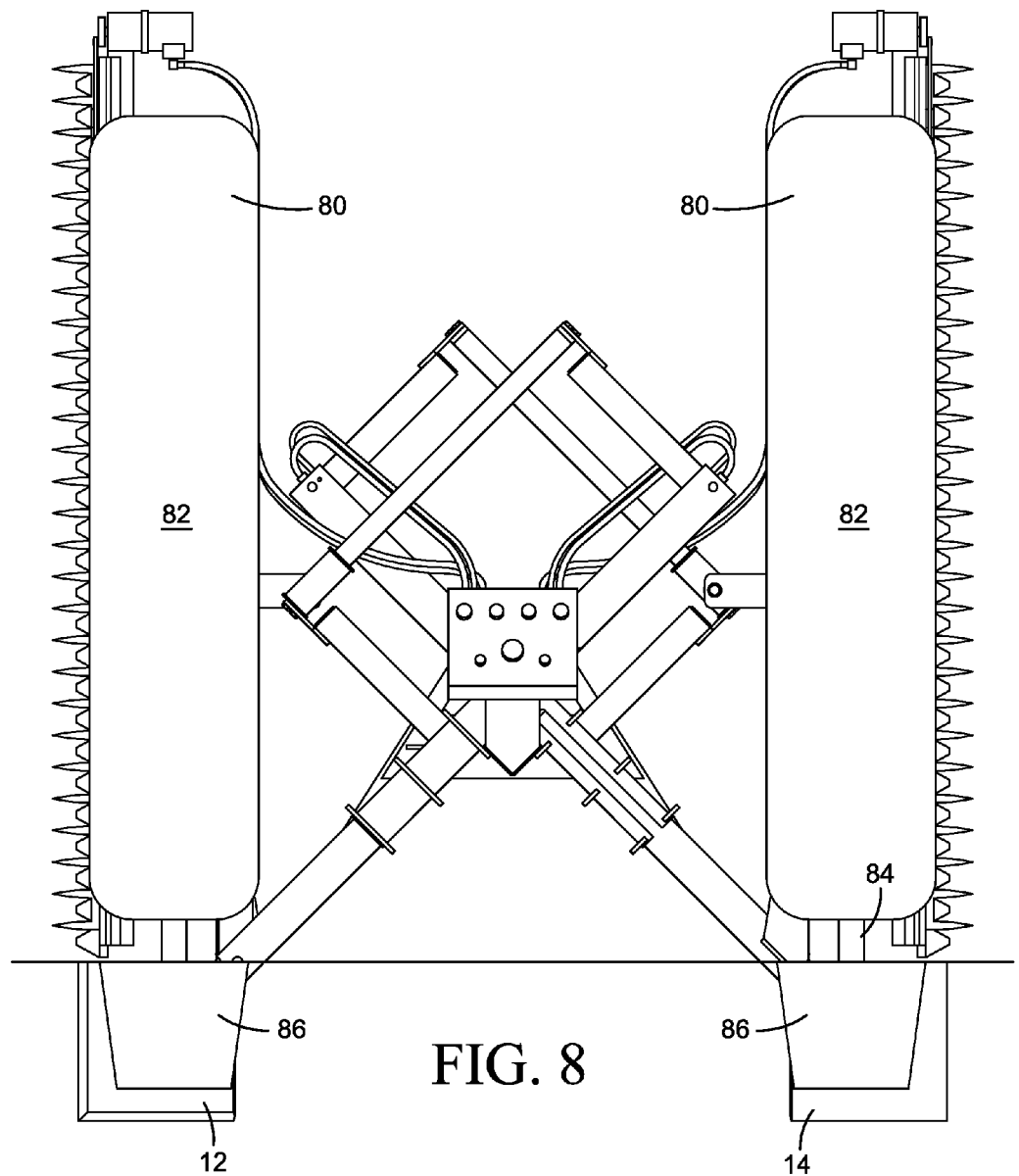
FIG. 8 is back view of a double spade hedge separator, positioned between two hedgerows, in an extended position.

FIGS. 7 and 8 disclose the use of the double spade hedge separator in a typical operating environment. Two parallel hedgerows 80 are schematically represented in parallel relationship. The typical hedgerow plant can be broken down into three sections, the woody vines and leafy vegetation area comprised of woody stalks, branches and leaves 82, the root ball 86 and the root flare area 84 which is the region where the stalks transition into roots. In FIGS. 7 and 8 the ground surface is represented by line 88.

In FIG. 7 the double spade hedge separator 10 is shown in the retracted position, with left and right blades 12 and 14 fully retracted. This is the transport position where the tractor or other means of transport can be moved down the existing parallel rows of hedges to the desired location. Once properly positioned, the double spade hedge separator is held stationary, and the hydraulics activated to drive left and right blades 12 and 14 into and through the root flare and the root ball, while the left and right vegetation cutter assemblies are actively operating to simultaneously cut through the vegetation above the root flare area. In this manner two shorter segments of hedge row can be separated. All that remains is for the nursery operator to use a convention prior art U-shaped plow blade to be driven underneath and along the root ball to separate out the sides and bottom of the root ball from the hedgerow earthen bed, and the hedgerow segment is ready to be picked up and deposited into an appropriately sized, biodegradable tray which can then be loaded onto transport for transportation to the landscaping job site for replanting as a fully formed hedgerow.

Figure 9:
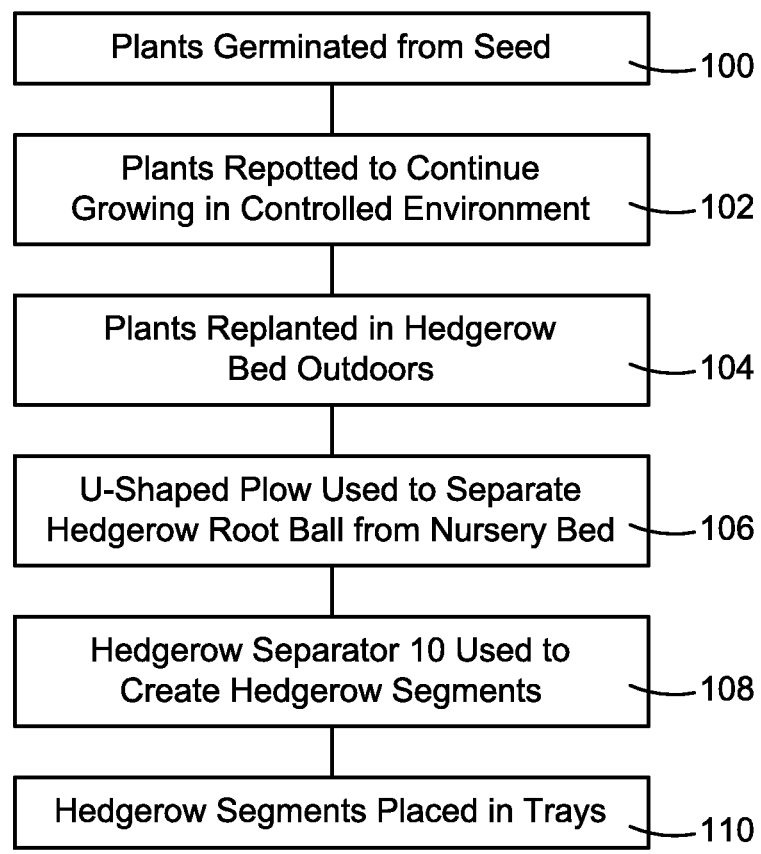
FIG. 9 is a system flow chart for the automated system of transplanting a length of hedgerow from a nursery grown hedgerow to a landscaping jobsite.

FIG. 9 is a block diagram outlining the automated system for moving and transplanting hedgerows of the present invention. As can be seen, the hedgerow is planted from seed as shown in block 100, and as the plants germinate and grow to a designated size at which time they are repotted and continue to grow to a size appropriate for transplanting to an outdoor hedgerow bed in the nursery as shown in block 102, they can then be transplanted into a row in the nursery where they will continue to grow until they fully form a hedgerow of acceptable size and density as shown in block 104. Next the root balls are cut using a standard U shaped root cutter which is driven into the ground, underneath the root ball along the hedgerow in a plow like fashion to prune the roots, which separates the bottom and the sides of the root ball from the surrounding earth as shown in block 106. The hedge separator 10 is then driven between the rows of the now fully formed hedges where hedgerow segments of preselected lengths of each row can then be separated from the elongated hedgerow into a length that is suitable for handling, transport and transplanting as shown in block 108. A lifting device of some sort is then used to pick up each uniform section of hedgerow and deposit it into a waiting, tray which can then be itself picked up and transported to the landscaping job site as shown in block 110.

At the job site, the process is then reversed as the preformed hedgerow sections are offloaded at the job site and again, picked up and placed in alignment, one to the other in a trench along the length of the intended hedgerow. Once the hedgerow sections have been aligned in position in the trench, the trench is then back filled and suitable mulching materials can be deposited around the base of the hedgerow, near the location of the root flair. The hedge is then fully formed and constitutes an attractive and mature looking hedgerow without having to attend to individual plants and plant each one by hand as has been done in the past.

While certain exemplary embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

We claim:

1. A hedgerow cutter for cutting a hedgerow having a root mass, stalks, branches and foliage, into smaller hedgerow segments which comprises:
    a frame, having a vertically oriented centerline, adapted for attachment to a powered vehicle sized and configured to travel alongside, and parallel to a hedgerow;
    a root cutting spade assembly sized to be driven down and through the root mass of the hedgerow to separate the roots and root mass of consecutive plants in the hedgerow;
    an elongated hedge cutter assembly, for cutting through the hedgerow stalks, branches and foliage, said hedge cutter assembly attached to the upper portion of the spade assembly and oriented to extend generally upwardly;
    means for moveably attaching the root cutting spade assembly and the hedge cutter assembly to the vertically oriented frame; and
    means for extending the root cutting spade assembly outwardly and downwardly away from the centerline and into the hedgerow root mass to separate the root mass of the hedgerow segment from the hedgerow and extending the hedge cutter assembly to into the stalks, branches and foliage of the hedgerow to separate the hedgerow segment from the hedgerow.

2. The hedgerow cutter of claim 1 wherein the means for moveably attaching the root cutting spade assembly and the hedge cutter assembly to the vertically oriented frame further comprises:
    an upper guide bar and a lower guide bar, each having a longitudinal axis and affixed to the frame in parallel spaced relationship, one to the other, and oriented at an diagonal angle, pointing downwardly toward the hedgerow segment to be separate, said diagonal angle established to configure the upper and lower guide bars in a position to place the root cutting spade assembly in a position to completely sever the hedgerow segment root mass when the root cutting spade assembly is fully extended outwardly and downwardly from the centerline of the frame;
    means for slidably and moveably attaching the root cutting spade assembly and the elongated hedge cutter assembly to upper and lower guide bars; and
    means for driving the root cutting spade and the elongated hedge cutter assembly down and away from the centerline of the frame in the direction of the longitudinal axis of the upper and lower guide bars.

3. The hedgerow cutter of claim 2 wherein the means for driving the root cutting spade and the elongated hedge cutter assembly down and away from the centerline of the frame in the direction of the longitudinal axis of the upper and lower guide bars further comprises:
    a hydraulic ram operatively affixed to the root cutting spade assembly and the lower guide bar in parallel relationship to the lower guide bar; and
    means for operatively controlling the operation of the hydraulic ram.

4. The hedgerow cutter of claim 3 wherein the means for operatively controlling the hydraulic ram includes a GPS control unit for detecting the exact location of the hedgerow cutter, controlling the movement of the hedgerow cutter to position it at a predetermined location, holding hedgerow cutter stationary when correctly positioned, and operatively controlling the hydraulic ram when the hydraulic cutter is correctly position to separate a hedgerow segment.

5. The hedgerow cutter of claim 2 wherein the elongated hedge cutter assembly, for cutting through the hedgerow stalks, branches and foliage, said hedge cutter assembly attached to the upper portion of the spade assembly and oriented to extend generally upwardly further comprises:
- a reciprocal scissors cutting assembly having a plurality of stationary cutting teeth and a plurality of reciprocating teeth for slideable interacting with said stationary cutting teeth; and
- means for reciprocating teeth in a reciprocal fashion against the stationary teeth.

6. A hedgerow cutter for cutting a hedgerow having a root mass, stalks, branches and foliage, into smaller hedgerow segments which comprises:
- a frame, having a vertically oriented centerline, adapted for attachment to a powered vehicle sized and configured to travel alongside, and parallel to a hedgerow;
- a pair of root cutting spade assemblies sized to be driven down and through the root mass of the hedgerow to separate a segments of the hedgerow root mass from two parallel hedgerows;
- a pair of elongated hedge cutter assemblies, for cutting through the hedgerow stalks, branches and foliage, said hedge cutter assemblies each attached to the upper portion of one of the spade assemblies and oriented to extend generally upwardly;
- means for moveably attaching the root cutting spade assemblies and the hedge cutter assemblies to the vertically oriented frame; and
- means for extending the root cutting spade assemblies outwardly and downwardly in opposite directions away from the centerline and into the hedgerow root mass to separate the root mass of a hedgerow segment from each of the hedgerows and extending the hedge cutter assemblies into the stalks, branches and foliage of the parallel hedgerows to separate the hedgerow segments from the hedgerows.

7. The hedgerow cutter of claim 6 wherein the means for moveably attaching the root cutting spade assembly and the hedge cutter assembly to the vertically oriented frame further comprises:
- an upper guide bar and a lower guide bar, each having a longitudinal axis and affixed to the frame in parallel spaced relationship, one to the other, and oriented at an diagonal angle, pointing downwardly toward the hedgerow segment to be separate, said diagonal angle established to configure the upper and lower guide bars in a position to place the root cutting spade assembly in a position to completely sever the hedgerow segment root mass when the root cutting spade assembly is fully extended outwardly and downwardly from the centerline of the frame;
- means for slidably and moveably attaching the root cutting spade assembly and the elongated hedge cutter assembly to upper and lower guide bars; and
- means for driving the root cutting spade and the elongated hedge cutter assembly down and away from the centerline of the frame in the direction of the longitudinal axis of the upper and lower guide bars.

8. The hedgerow cutter of claim 7 wherein the means for moveably attaching the root cutting spade assemblies and the hedge cutter assemblies to the vertically oriented frame further comprises:
- two pairs upper guide bars and a lower guide bars, each having a longitudinal axis with each pair affixed to the frame, and oriented at an diagonal angle, pointing downwardly in opposite directions toward the hedgerow segments to be separated, said diagonal angle established to configure each pair upper and lower guide bars in a position to place the root cutting spade assembly in a position to completely sever the hedgerow segment root mass when the root cutting spade assembly is fully extended outwardly and downwardly from the centerline of the frame;
- means for slidably and moveably attaching the root cutting spade assemblies and the elongated hedge cutter assemblies to upper and lower guide bars; and
- means for driving the root cutting spade and the elongated hedge cutter assemblies down and away, in opposite directions, from the centerline of the frame in the direction of the longitudinal axis of the upper and lower guide bars.

9. The hedgerow cutter of claim 8 wherein the means for driving each of the root cutting spade and the elongated hedge cutter assemblies down and away from the centerline of the frame in the direction of the longitudinal axis of the upper and lower guide bars comprises:
- a hydraulic ram operatively affixed to the root cutting spade assembly and the lower guide bar in parallel relationship to the lower guide bar; and
- means for operatively controlling the operation of the hydraulic ram.

10. The hedgerow cutter of claim 9 wherein the means for operatively controlling the hydraulic ram includes a GPS control unit for detecting the exact location of the hedgerow cutter, controlling the movement of the hedgerow cutter to position it at a predetermined location, holding hedgerow cutter stationary when correctly positioned, and operatively controlling the hydraulic ram when the hydraulic cutter is correctly position to separate a hedgerow segment.

11. A method of cutting a hedgerow having a root mass, stalks, branches and foliage and growing in the ground, into smaller hedgerow segments which comprises:
- driving a root cutting plow underneath and along each side of a hedgerow root mass to separate a segment of the root mass and adjacent bedding material from the surrounding ground;
- separating a segment of hedgerow from the hedgerow using a hedgerow segment separating apparatus having a frame, defining a vertically oriented centerline, said frame adapted for attachment to a powered vehicle sized and configured to travel alongside, and parallel to a hedgerow, and a root cutting spade assembly sized to be driven down and through the root mass of the hedgerow to separate a segment of the hedgerow root mass from the hedgerow and an elongated hedge cutter assembly, for cutting through the hedgerow stalks, branches and foliage, said hedge cutter assembly attached to the upper portion of the spade assembly and oriented to extend generally upwardly, means for moveably attaching the root cutting spade assembly and the hedge cutter assembly to the vertically oriented frame, and means for extending the root cutting spade assembly outwardly and downwardly away from the centerline and into the hedgerow root mass to separate the root mass of the hedgerow segment from the hedgerow and extending the hedge cutter assembly to into the stalks, branches and foliage of the hedgerow to separate the hedgerow segment from the hedgerow.

* * * * *